United States Patent

[11] 3,619,315

| [72] | Inventors | David Ian Carrack;<br>Eric Ivan Riseley; Derek Kingston, all of<br>Harrogate, England |
|---|---|---|
| [21] | Appl. No. | 691,945 |
| [22] | Filed | Dec. 20, 1967 |
| [45] | Patented | Nov. 9, 1971 |
| [73] | Assignee | Imperial Chemical Industries Limited<br>London, England |

[54] METHOD OF MANUFACTURING A POLYURETHANE COATED SHEET MATERIAL
4 Claims, No Drawings

[52] U.S. Cl. .................................................. 156/77,
156/84, 156/181, 156/247, 156/331, 161/155,
161/406, 161/DIG. 2
[51] Int. Cl. ...................................................... B32b 5/18
[50] Field of Search............................................ 156/84,
181, 247, 280, 331, 334; 161/155, 166, 406, DIG.
2; 156/77

[56] References Cited
UNITED STATES PATENTS

| 2,485,967 | 10/1949 | Harding................... | 156/241 |
|---|---|---|---|
| 2,723,935 | 11/1955 | Rodman..................... | 161/166 |
| 3,059,311 | 10/1962 | Hochberg.................. | 28/72.2 |
| 3,336,183 | 8/1967 | Larner, Jr. et al. ........... | 156/280 X |

FOREIGN PATENTS

| 144,149 | 0/1962 | U.S.S.R. ...................... | 161/155 |

*Primary Examiner*—Leland A. Sebastian
*Attorney*—Leonard Horn

ABSTRACT: A method for the manufacture of a coated sheet material having an improved flex-life, comprising applying to a flexible fibrous substrate having at least one base layer of a cured polyurethane composition, a relatively thin adhesive layer of a curable polyurethane composition dissolved in an organic solvent; allowing the solvent to evaporate from the adhesive layer for a time sufficient for the adhesive layer to become substantially dry, but insufficient for significant curing thereof to take place, laminating to the substantially dry adhesive layer a layer of a dried and cured, or partially cured, polyurethane composition supported on a release band; and removing the release band after final curing of the or each layer.

METHOD OF MANUFACTURING A POLYURETHANE COATED SHEET MATERIAL

The present invention relates to a method of manufacturing a coated sheet material.

It is known to produce leatherlike materials by coating flexible substrates with polymeric materials, such as polyurethanes for example. One method which has previously been proposed for coating a flexible substrate with a polyurethane composition, referred to herein as the "blanket coating" method, has proved to be suitable in the production of such a coated material. In the blanket coating method a sheet of a flexible substrate having a polyurethane subcoat thereon and a release band sheet material are fed under a loaded roller and a polyurethane coating composition dissolved in an organic solvent is poured onto the surface of the flexible substrate just before it passes under the roller. The latter spreads the coating composition over the width of the flexible substrate and simultaneously sandwiches the coating composition between the flexible substrate and the release band. After evaporation of the solvent and curing of the coating composition the release band is stripped off. The resulting leatherlike material is suitable for use in many outlets, but has been found to have a restricted flex life performance for use as shoe-upper material.

An object of the present invention is to provide a method of manufacturing a coated sheet material which has an improved flex life over that material produced using the blanket coating method.

According to the present invention, a method for the manufacture of a coated sheet material having an improved flex life, comprised applying to a flexible fibrous substrate having at least one base layer of a cured polyurethane composition, a relatively thin layer (herein referred to as the adhesive layer) of a curable polyurethane composition dissolved in an organic solvent; allowing the solvent to evaporate from the adhesive layer for a time sufficient for the adhesive layer to become substantially dry, but insufficient for substantial curing thereof to take place; laminating to the substantially dry adhesive layer a layer of a dried and cured or partially cured, polyurethane composition supported on a release band; and removing the release band after final curing of the or each layer which is not fully cured.

The flexible substrate is coated with one or more layers of a curable polyurethane composition dissolved in an organic solvent and drying and curing the same. When more than one coating layer is being applied each layer is at least partially dried before application of the next layer. The process also includes the prior steps of coating a layer of a curable polyurethane composition dissolved in an organic solvent onto the release band and drying and curing, or partially curing, the layer while supported on the release band. For this purpose the release band may have both surfaces thereof possessing release properties to enable the release band and the polyurethane composition thereon to be wound up, if desired, during curing of the layer of the polyurethane composition.

The curable polyurethane composition of the adhesive layer is substantially uncured before the release band coating is laminated thereto and this has a sufficient degree of tackiness to adhere the release band coating layer to the outermost coating layer on the flexible substrate.

The polyurethane compositions of the several layers of the coated sheet material of the invention may be the same, similar or different. The or each polyurethane composition which is applied to the flexible substrate and that which is applied to the release band are in liquid form so that they can be applied using well-known coating methods such, for example, as by extrusion, curtain coating, lick roll, spraying, brushing or doctor knife techniques. Applying the or each polyurethane composition dissolved in an organic solvent facilitates the application thereof.

The or each polyurethane composition is mixed with the appropriate curing agents prior to application and with any other ingredients as may be desired, such as coloring agents, fillers and accelerators. The liquid composition may be a polyurethane prepolymer obtained by reacting a polyester, polyether, polyesteramide, or polyamide with an organic polyisocyanate or with a mixture of organic polyisocyanates. Generally, it will be necessary to mix the polyurethane prepolymer with a cross-linking agent and catalyst immediately prior to its application. It has been found that the or each polyurethane composition may tolerate the inclusion therein of up to 10% by weight of another polymeric material which does not adversely affect the flexing properties of the polyurethane, for example polyvinyl chloride.

The flexible substrate which is coated according to the invention may be a fibrous sheet material comprising knitted, woven or nonwovern fibers, or comprising of combination of layers of these, and may be impregnated with an elastomeric or resinous filling agent. (The term 'fibres' as used herein embraces fibers in staple form, filaments and yarns.) These fibrous sheet materials may be formed wholly or partly of synthetic fibers such as, for example, polyesters, polyolefines, polyamides, or a mixture of these.

A preferred fibrous sheet material for use as the flexible substrate in the present invention is in the form of an impregnated needle-punched web of synthetic fibers.

Such a material has been found to make a desirable substrate in the manufacture of a coated sheet material, by the method of the invention, which is intended as a shoe-upper material. The initial coating base layer(s) forming a subcoat on the flexible substrate is/are formed of a polyurethane composition incorporating a coloring agent and water-soluble salt particles. After the solvent has been evaporated from the subcoat it is then cured by heating. After curing, the water-soluble salt particles are leached out of the subcoat on the flexible substrate to render it microporous and permeable to water vapor. The relatively thin adhesive layer is applied to the porous, cured subcoat and is heated so that the solvent is evaporated rapidly away therefrom in order to dry the subcoat without substantial curing thereof taking place. A polyurethane composition, which may include a coloring agent, is supported on a release band, for example a sheet of polyethylene, and while it is preferably in a dried and cured state, is laminated onto the adhesive layer. Curing may then be completed either at room temperature or at an elevated temperature, and the release band removed. The latter may be embossed so that the external surface of the final coating layer of the sheet material exhibits a pattern simulating the grain of natural leather.

When such a coated sheet material was tested to determine its flex life it was found to have a flex life much increased over that of a material comprising an identical substrate coated with the same coating composition which was applied using the blanket coating method. Furthermore, it has been found that if the adhesive layer of the material of the invention does not contain pigments which may be used as coloring agents in the other layers then the flex life of the material is further improved.

| Material | Median Flex Life* (flexes) |
| --- | --- |
| i. Material by blanket coating method | $1.6 \times 10^4$ |
| ii. Material with pigmented adhesive layer | $4.5 \times 10^4$ |
| iii. Material with nonpigmented adhesive layer | $8.6 \times 10^4$ |

*The flex life was measured on the SATRA flexometer designated STM 101.

It has also been found that better flex life results are achieved when the coating layer on the release band is applied in a cured state rather than a partially cured state.

The provision of a cured top coating layer on the release band prior to laminating has other advantageous ramifications. For example, it allows the coating layer on the release band to be inspected for flaws before lamination. Also, it provides a commercially attractive method of providing a material of a specific surface from a basic stock of substrate material, for various colors and finishes of coating could be applied to a stock-substrate such as subcoated nonwoven material to produce a shoe-upper material.

A preferred embodiment of the invention will be further described by way of the following example:

A coated sheet material, particularly suitable for use as a shoe upper material, and having a total thickness of approximately 1.5 mm. was produced as follows:

A flexible substrate was prepared by forming a nonwoven batt consisting of a mixture of 45 percent by weight of shrinkable polypropylene fibers (1½ inches staple length, 3 denier per filament) and 55 percent by weight of substantially heat stable polyethylene terephthalate fibers (1½ inches staple length, 1.5 denier per filament). The batt was passed several times through a needleloom until the batt was needlepunched to a level of about 1500 punches per square centimeters. The needled batt was then passed through an oven with high-pressure steam (55 p.s.i.g.; 154° C.) for about 5 minutes, during which treatment to the batt underwent an area shrinkage of about 35 35 percent This consolidated batt was calendered and then impregnated with 25 percent by weight of a butadiene-methacrylate copolymer. The filling agent was then cured.

The consolidated, impregnated batt was then coated on one side thereof with a subcoat having a thickness of 0.75 mm., using the following materials:

FIRST COATING MIX

| Ingredient | Parts by Weight |
| --- | --- |
| A | 100 |
| B | 384 |
| C | 250 |
| D | 0.5 |
| E | 0.05 |
| F | 50 |

SECOND COATING MIX

| Ingredient | Parts by Weight |
| --- | --- |
| A | 100 |
| B | 384 |
| C | 250 |
| D | 0.5 |
| E | 0.05 |
| F | 50 |
| G | 11.5 | where:

'A' is a polyurethane elastomer which is the reaction product of a 65:35 mixture of tolylene-2:4 and -2:6 diisocyanates with an ehtylene glycol/ethanolamine adipate having a melting point of less than 50° C. an acid value of 3.0 mg. KOH per g., and containing 16 moles of adipic acid for every mole of primary amino groups. Its method of preparation is as follows:

A mixture of 433 parts of adipic acid, 1820 parts of ethylene glycol, 177 parts of diethylene glycol and 113 parts of monoethanolamine is heated at 240° C. under reflux until an acid value of 2 to 3 mg. KOH per g. is obtained. The acid value and the hydroxyl value of the polymer so formed are determined and equimolecular amounts of this polymer and a 65:35 mixture of tolylene-2:4 and -2:6 diisocyanates are mixed at 80° C. and then heated at 130° C. for 4 hours, to give the final product.

'B' is sodium chloride having a particle size of less than 50 microns.

'C' is methyethylketone as solvent for 'A'.

'D' is carbon black pigment.

'E' is dimethylphenylethylamine as catalyst.

'F' is a cross-linking agent and comprises a 40 percent solution in butyl acetate of an isocyanurate polymer of tolylene diisocyanates, the solution containing 5.8 percent of isocyanate groups. It is prepared as follows:

A solution of 89 parts of 65:35 mixture of tolylene-2:4 and -2:6 diisocyanates in 134 parts of dry butyl acetate is stirred in an atmosphere of nitrogen at 55° C., and 0.47 parts of calcium naphthenate and 0.15 parts of phenol added. The mixture is stirred until the isocyanate value has dropped to 5.8 percent, 0.05 part of phosphoric acid is then added and the mixture is stirred at 55° C. for 30 minutes to produce the final product.

'G' is a cross-linking agent which is a 50% solution in ethyl acetate of an isocyanurate polymer of tolylene diisocyanates, the solution containing 11% of isocyanate groups, and which is prepared as follows:

995 parts of a 65:35 mixture of tolylene-2:4 and -2:6 diisocyanate, six parts of lead naphthenate and 1010 parts of ethyl acetate are stirred and heated under an inert atmosphere at 75°–77 C. until the isocyanate level has dropped to 11 percent. A solution of 0.05 part of phosphoric acid in five parts of ethyl acetate is added and the mixture stirred for 1 hour.

The term "isocyanate value" used above is the percentage weight of the mixture present as isocyanate group.

The subcoat was built up on the batt from several layers of the first coating mix and then several layers of the second coating mix, all of which layers were applied using a doctor knife technique. The solvent was extracted from the subcoat by heating using hot air at 35°–40° C., and the subcoat was then cured for 36 hours at 53° C. After curing, the sodium chloride particles were leached from the subcoat by submerging the coated substrate in flowing water at room temperature for 24 hours, or alternatively, by winding and reverse winding the coated substrate for 3½ hours through running water at a temperature of 60° C. The coated substrate was then dried by passing it over cylinders having their surfaces maintained at 124° C.

A third coating mix was prepared from the following ingredients:

| | |
| --- | --- |
| A | 100 parts by weight |
| C | 316 |
| E | 0.05 |
| F | 30 |
| G | 8 |

Using this third coating mix, adhesive layer was applied to the cured and leached subcoat of the substrate using a doctor knife technique. The adhesive layer was applied as a "Scrape" coat, the clearance of the doctor knife being such that the subcoated substrate was just capable of movement under the doctor knife. The solvent extracted rapidly with hot air at 35°–40° C. from the adhesive layer for a time sufficient to dry it, but insufficient for significant curing thereof to take place.

A fourth coating mix was made having the following ingredients:

| | |
| --- | --- |
| A | 100 parts by weight |
| C | 595 |
| D | 5 |
| E | 0.05 |
| F | 30 |
| G | 8 |

The fourth coating mix was applied to an embossed polyethylene sheet, the solvent was extracted from the coating layer using hot air at 35°–40° C. and the coating layer was cured on the polyethylene sheet at room temperature for 24 hours. The coating layer had a dry thickness of 0.0125 mm.

The dried and cured coating layer on the polyethylene sheet was laminated to the dried but substantially uncured adhesive layer on the substrate by bringing them into contact followed by passage through nip rolls.

The polyethylene sheet was stripped from the coated sheet material when the adhesive layer was cured. The resulting sheet material was leatherlike in appearance, was water vapor permeable, had a flex life of 8.6×10⁶ flexes, and was highly suitable as a shoe upper material.

What we claim is:

1. A method for the manufacture of a coated sheet material having an improved flex life, comprising applying to a flexible fibrous substrate having at least one base layer of a cured polyurethane composition, a relatively thin adhesive layer of a curable polyurethane composition dissolved in an organic solvent; allowing the solvent to evaporate from the adhesive layer for a time sufficient for the adhesive layer to become substantially dry, but insufficient for significant curing thereof to take place; laminating to the substantially dry adhesive layer a layer of a dried and cured, or partially cured, polyurethane composition supported on a release band; and removing the release band after final curing of the or each layer.

2. A method according to claim 1, wherein the or each base layer is applied to the substrate in the form of a solvent-containing polyurethane composition incorporating water-soluble salt particles, the latter being leached out after evaporation of the solvent and curing of the polyurethane composition to render it microporous and water vapor permeable.

3. A method according to claim 1 wherein the polyurethane compositions of the base layer(s), adhesive layer and the top layer applied to the substrate are the same or different.

4. A method according to claim 2 wherein the polyurethane composition of the base layer(s), adhesive layer and the top layer applied to the substrate are the same or different.

* * * * *